United States Patent
Levine et al.

(10) Patent No.: US 6,727,887 B1
(45) Date of Patent: Apr. 27, 2004

(54) WIRELESS POINTING DEVICE FOR REMOTE CURSOR CONTROL

(75) Inventors: James Lewis Levine, Yorktown Heights, NY (US); Michael Alan Schappert, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 1,826 days.

(21) Appl. No.: 08/369,011

(22) Filed: Jan. 5, 1995

(51) Int. Cl.[7] ................................................. G09G 5/08
(52) U.S. Cl. ...................... 345/158; 345/157; 345/169; 345/173
(58) Field of Search ................................ 345/156, 157, 345/158, 169, 173, 175, 176, 177, 178, 180; 178/18, 19, 18.01–18.11, 19.01–19.07; 348/114, 135, 734; 248/148 B; 463/37, 39

(56) References Cited

U.S. PATENT DOCUMENTS

| | | | | |
|---|---|---|---|---|
| 4,150,285 A | * | 4/1979 | Brienza et al. | 348/135 |
| 4,565,999 A | | 1/1986 | King et al. | 345/158 |
| 4,647,771 A | * | 3/1987 | Kato | 345/166 |
| 4,745,402 A | | 5/1988 | Auerbach | 345/158 |
| 4,796,019 A | * | 1/1989 | Auerbach | 345/158 |
| 4,804,949 A | * | 2/1989 | Faulkerson | 345/166 |
| 4,807,166 A | * | 2/1989 | Zalenski | 178/18 |
| 4,935,619 A | | 6/1990 | Heberle | 345/166 |
| 5,023,943 A | | 6/1991 | Heberle | 359/148 |
| 5,146,210 A | | 9/1992 | Heberle | 345/146 |
| 5,302,968 A | | 4/1994 | Heberle | 345/131 |
| 5,349,460 A | * | 9/1994 | Ogasahara et al. | 345/157 |
| 5,504,501 A | * | 4/1996 | Hauck et al. | 345/157 |

FOREIGN PATENT DOCUMENTS

| | | |
|---|---|---|
| FR | 2 611 291 | 2/1988 |
| JP | 63-223913 | 9/1988 |
| JP | 2-226994 | 9/1990 |
| JP | 4-302275 | 10/1992 |
| WO | WO 8804060 | 6/1988 |

OTHER PUBLICATIONS

IBM Technical Disclosure Bulletin, "Wireless Pointing Device", vol. 36, No. 6B, Jun. 1993, Armonk, NY.

* cited by examiner

*Primary Examiner*—Lun-Yi Lao
(74) *Attorney, Agent, or Firm*—McGuire Woods, LLP (57) ABSTRACT

There is provided a hand held cursor controller system for use particularly with interactive television and computer presentation graphics. The system uses a hand held device with infrared light emitting diodes which transmits to a detector attached to a processor. The information from the processor is transmitted to a television or video cassette recorder. The system allows for the positioning of a cursor on a television screen with the only input of the user being the aiming of the controller. It includes push-button activation and provides for the transmission of the usual controller codes.

18 Claims, 5 Drawing Sheets

FIG.6B

WIRELESS POINTING DEVICE FOR REMOTE CURSOR CONTROL

BACKGROUND OF THE INVENTION

1. Field of the Invention

The present invention relates generally to the field of user interactive media interfaces and, more particularly, to a wireless pointing device for cursor control in interactive television and computer presentation graphics.

2. Description of the Prior Art

A generally established method to provide human interaction with a system controlled by a computer is to provide the user with a graphical display of choices and a pointing device, such as a cursor controlled by a mouse. The pointing device is used to manipulate the position of a cursor on the computer display or television (TV) screen to designate to the computer some desired action. The pointing device is usually provided with a computer-sensed button or switch, which can be pressed to cause the action to occur.

There is a need for a selection device with the functional capability of a mouse, specifically the ability to (1) designate a displayed option for action by moving a cursor, and (2) initiate the action by pressing a button. For consumer applications, it is important that the device be intuitive to use.

In the field of interactive television, the setting may be the home television room and the user may be any untrained member of the household. It is common for the user to be seated six feet or more from the television set, and thus out of reach of any controls built into or connected to the television. In the field of computer presentation graphics, the setting may be a lecture room, classroom, or unprepared demonstration area, and those present, who may have minimal training, may be standing or walking freely about the room.

The majority of pointing devices were developed for desktop use in conventional computing environments, and are poorly suited for the above applications. For example, a mouse, joystick or trackball is normally wired to the computer. The mouse requires a smooth, flat surface on which to roll, while the joystick or trackball must be fixed in a stable position for smooth operation. These devices also require some degree of fine muscle control and are difficult to use while standing or seated away from a desk. Furthermore, they are not intuitive devices, so that untrained users may find it difficult to grasp the relationship between the cursor position and the hand or finger motions required to move it.

An alternative device which eliminates the wire is a joystick or trackball built into a handheld device. The motion of the ball or stick may be sent to the computer via an infrared (IR) or radio frequency (RF) communication link. Such devices suffer from the other problems mentioned above and may require two handed operation, a further disadvantage.

Yet another alternative is a wireless hand held device equipped with an array of pushbuttons or a multi-element rocker switch. These do not require a stable surface, but they do require the user to remove his eyes from the screen to locate buttons. They are even less intuitive than the other devices, as the user is required to grasp the relationship between an arbitrary button and text or images displayed on the screen.

U.S. Pat. No. 4,565,999 to King et al. describes a "light pencil". This is head mounted and used to steer a cursor by head motion. Four infrared light emitting diodes (IRLEDs) are used in the light pencil, with a single detector at the screen. The IRLEDs are aimed somewhat off-axis in orthogonal directions and pulsed sequentially, allowing the received signal from each to be separately measured. The four values are used to compute an aiming direction. The light pencil, as described by King et al., lacks push-button function (head gestures are used) and has rather crude digital filtering to reduce cursor jitter caused by muscular tremors. The intent is to enable a person to position a cursor by turning the head in the desired direction. While such a device could also be held and aimed manually, the preferred embodiment as described in King et al. uses an awkward head motion (an abrupt nod) to initiate action after the cursor is positioned. Other shortcomings related to the implementation will be discussed below.

SUMMARY OF THE INVENTION

It is therefore an object of the present invention to provide a wireless device to manually position a cursor on a display device by an intuitive direct pointing action.

It is further an object of the invention to provide the pushbutton function of a standard computer pointing device and in such a way that the anticipatory and final motions involved in pressing the button do not affect the cursor position.

It is also an object of the invention to provide a mechanism for the transmission of binary codes to a remote television at negligible additional cost.

According to the invention, there is provided an infrared controller for an interactive device, such as a television or video cassette recorder (VCR). The device allows a cursor to be positioned merely by aiming the controller. It includes means for push-button activation and optionally provides for the transmission of the usual controller codes.

The invention is a combination of the aiming function of a light pencil and the code-transmitting function of an infrared television or VCR controller, in which the internal mechanism of the controller is shared between the two functions. The innovative combination provides an intuitive mechanism to position a cursor by rotating the controller in the desired direction. It also provides for push-button activation of the action designated by the cursor and optionally provides for transmitting television or other control codes.

The invention makes use of the principles of a light pencil, with improvements in the data processing to provide better performance, the addition of a new function in the form of push-button actuation, and further new functions allowing the transmission of standard control codes. In addition, a diffusion filter is added to smooth out irregularities in the LED output variation with angle. Such variations, if uncorrected, were found to introduce irregular variation in cursor motion with pointing direction.

The invention makes use of the optical technology of King et al. In a conventional infrared (IR) controller, a single infrared light emitting diode (IRLED) is used to transmit coded information in the form of a timed series of modulated pulses. According to the present invention, three or more IRLEDs are mounted in the hand-held device, with their optical axes fanned out from the main axis of the device. For example, one IRLED may point down and to the left, the second may point down and to the right, and the third may point forward and up. Many other arrangements of IRLEDs are possible. The hand held device includes at least one pushbutton, referred to as the action button, but may include others. The action button is used to initiate an action responsive to the position of the cursor.

An infrared detector is located in the general vicinity of the television or computer display. The IRLEDs are pulsed sequentially and the amplitudes of the light pulses reaching the detector are measured by a computer-controlled circuit connected to the detector. The light from an IRLED decreases progressively with an increase of the angle from its optical axis. Therefore, the relative amplitudes of the pulses will vary systematically with overall orientation of the device. The pointing direction is determined from the measured amplitudes, and used to position the cursor.

Coded information is sent by adding additional pulses to the pulse train. These pulses may be applied to all three IRLEDs to ensure reliable detection, or an additional IRLED may be used for this purpose. Any binary code may be sent in this way. One such code is used to indicate that the action button has been pressed. Additional buttons may be used to send other codes, enabling the device to emulate a two or three button pointing device and/or provide television-related control functions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
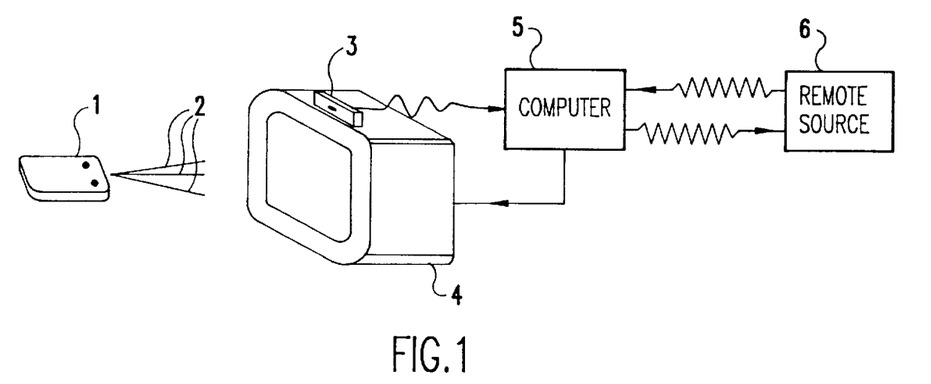
FIG. 1 is a high level block diagram illustrating the basic components in practice of the invention.

Referring now to the drawings, and more particularly to FIG. 1, there is shown a hand held controller 1, which emits infrared beams 2, and an optical receiving device 3, which receives the infrared beams 2. A display device 4 is connected to a computer 5 which also receives an input from the receiving device 3. The computer 5 may optionally be connected in a bidirectional manner to remote source 6, which provides data and/or images as part of an interactive system.

There are two modes of operation. In the pointing mode, the transmitter IRLEDs are pulsed in sequence, each pulse consisting of a burst of short pulses at a frequency in the 30–50 Khz range. The controllers normally apply such pulses to a single IRLED, hence only minor changes are required to drive three or more IRLEDs in sequence. The amplitude of each pulse is detected in the receiver 3, which consists of a photo-detector, tuned amplifier, and demodulator. The three or more pulse amplitudes are used to calculate an aiming direction. When a device, such as button 8, is pressed, an additional pulse or pulses is sent out. Detection of this extra pulse is taken as the "action" signal which may or may not be related to the cursor position. If desired, a second button can be used to send out yet another pulse or pulses, thus allowing the device to substitute for a standard two-button mouse.

In the optional code mode, control codes are transmitted via one or more of the LEDs. Such codes often consist of a start pulse, a stop pulse, and from one to eight intermediate pulses to transmit a one byte code. Here, the device will first send out one more pulse than the maximum number used in pointing mode, the group then acting as a start pulse. It will then send a code in the usual way. This mode would be provided in order to eliminate the need for a separate controller.

Figure 2A:
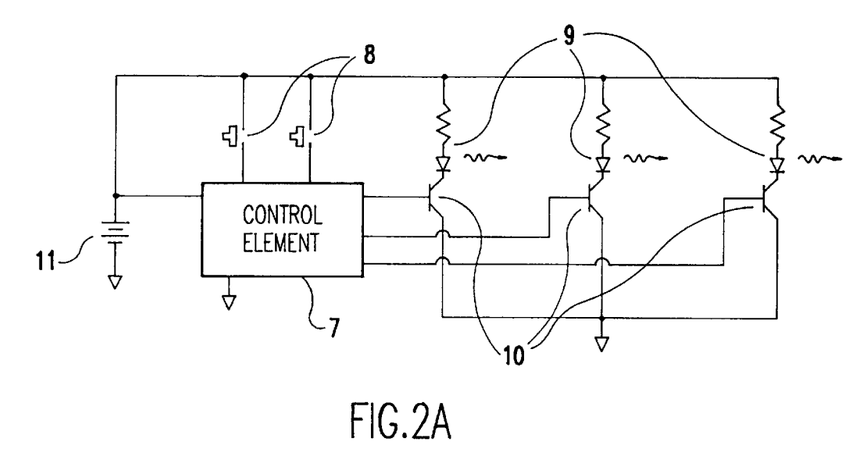
FIG. 2A is a block and schematic diagram showing the transmitter electronics.
Figure 2B:
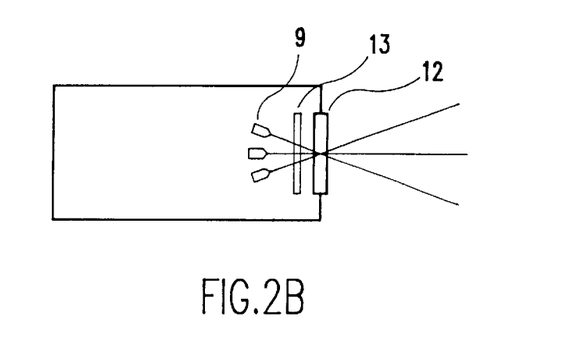
FIG. 2B is a schematic diagram of the transmitter showing the diverging IR beams.

The hand held device, or transmitter, is shown in more detail in FIGS. 2A and 2B. FIG. 2A shows the electronic circuit diagram. Logic control element 7 monitors the state of pushbuttons 8 and drives IRLEDs 9 through transistors 10. Control element 7 is preferably a permanently programmed microcontroller, which is both flexible and economical. A variety of commercially available microcontrollers may be used, for example those being currently manufactured for use in hand held TV and VCR remote control devices. It will be apparent to one versed in the art that the function of the control element 7 can be implemented with discrete logic elements as well. It will also be understood that while only two pushbuttons 8 are shown, there may be only one for a pointing device or there may be a plurality where the pointing device is incorporated into a TV or VCR controller.

Electrical power is supplied by battery 11, which may be rechargeable. In order to limit battery drain, the pointing pulses would be started by pressing the pushbutton, and continue for some predetermined time. This time would be extended each time the button was pressed. The IRLEDs 9 may be LD242 diodes manufactured by Siemens, Inc. These components are mounted within a housing shaped to fit the hand, with at least one button located at the natural resting position of the thumb or index finger, as in the case of a mouse or trackball.

Referring to FIG. 2B, the IRLEDs are located behind window 12, which may be formed of any plastic transparent to infrared radiation. For aesthetic purposes, the plastic may be opaque to visible radiation. Proper operation requires that the radiation from each IRLED decrease smoothly with angle. Various artifacts resulting from the LED manufacturing processes may distort the radiation pattern. These effects are reduced by the addition of optical diffusing filter 13. FIG. 2B also shows how the IRLEDs are arranged to provide three diverging but overlapping beams. While FIG. 2B is a two-dimensional representation of the diverging beams, it will be understood that the divergence of the beams is actually in three dimensions with beams projecting into and out of the plane of the figure. The beams first converge onto window 12, so that any dirt or scratches will have approximately equal effects on each beam, then diverge.

Figure 3:
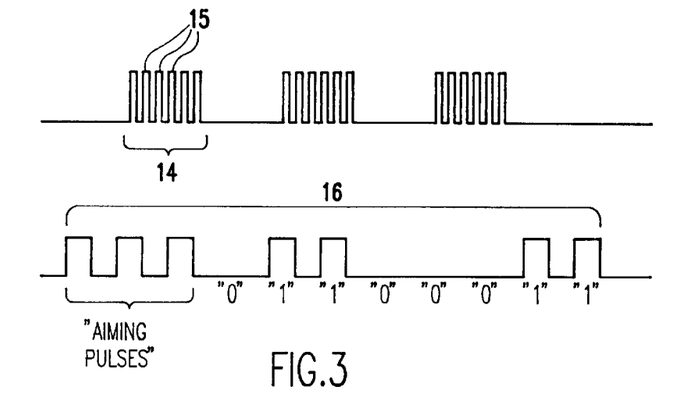
FIG. 3 is a timing diagram showing transmitted pulse sequences.

The operation of the transmitter may be understood with reference to FIGS. 2A and 3. Initially, control element 7 is in a passive state referred to as "sleep mode" to conserve battery power. When pushbutton 8 (or other activating device such as a motion sensor) is pressed, the control element "wakes up" and begins transmission. Thus it will be seen that pushbutton 8 may serve only as an "on/off" switch, may serve as the action signal switch, or both. This sleep mode is a common function of a microcontroller intended for low power operation. After a lack of button activity for a predetermined time as set by the program, for example 30 seconds, the processor will return to sleep mode.

Referring to FIG. 3, transmission consists of several pulse groups 14, which may be applied to one or more IRLEDs. Each group consists of a fixed number of individual pulses 15 at the center frequency of the detection filter. The pulses are applied to the IRLEDs through transistors 10 connected to output pins of element 7. These are switched on and off under control of a program stored in element 7. The program execution speed is fixed by a quartz crystal (not shown) connected to element 7, hence frequency, group length, and inter-group spacing are all accurately controlled. In accordance with the general discussion above, a first group of pulses is applied to one IRLED, a second group to another, and a third group to the last. When received, these pulses will be used to position the cursor. When a button is pressed, one or more additional pulse groups are applied to one or more IRLEDS simultaneously. Sequence 16 illustrates a code transmission consisting of the binary bit pattern 01100011, following three initial pulses. It will be understood that there are many alternative ways of encoding without departing from the spirit of this invention. In particular, the coded information can precede the pulses used to position the cursor. In this case, a special code may be used to indicate that position pulses will be sent.

In accordance with the method used to determine the pointing direction, yet to be discussed, the three IRLEDs should have approximately equal output power. Although it would be possible to hand-select sets of IRLEDs, a more economical procedure is to have control element 7 adjust the effective power by control of the individual pulse widths. This requires a one-time measurement of intensities using, for example, the receiver described below. The correct pulse widths can then be calculated and stored in a nonvolatile memory in or connected to element 7.

As with a conventional TV or VCR controller, the receiver uses a narrow band tuned amplifier to minimize interference from stray light. The infrared pulses are thus modulated at a matching carrier frequency. In addition, the receiver photodetector includes an optical filter with a moderately narrow pass band centered on the IRLED emission.

Figure 4:
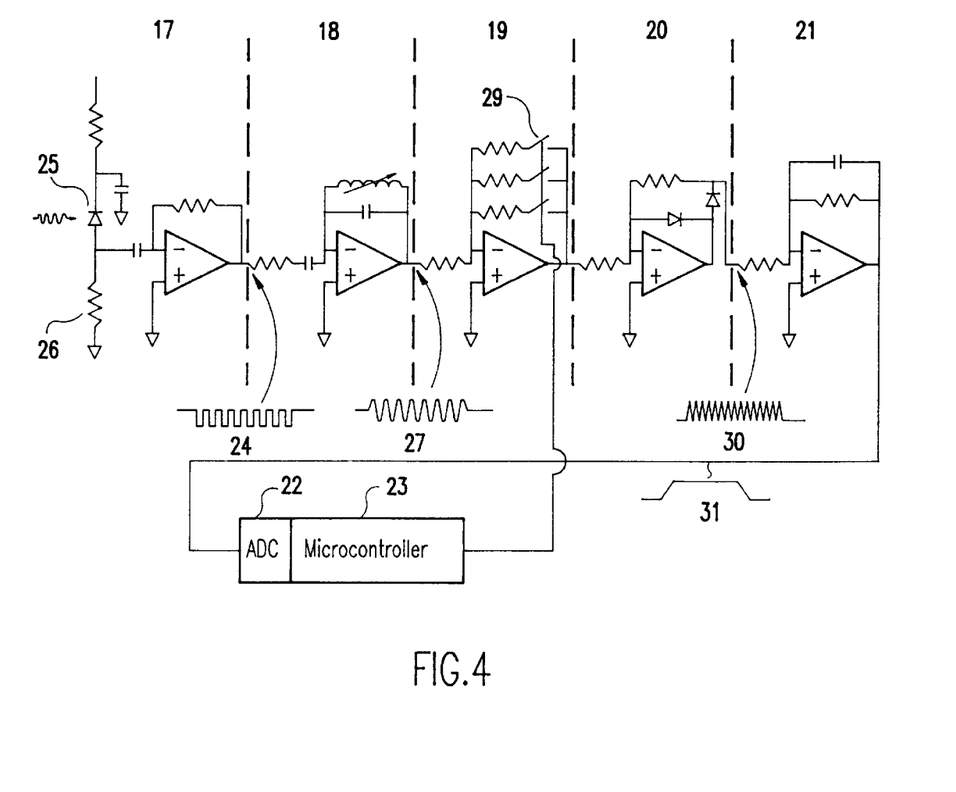
FIG. 4 is a block and schematic diagram showing the receiver electronics.

FIG. 4 is schematic diagram of the receiver which consists of six functional sections separated by dashed boxes. These sections are a photodetector and transimpedance amplifier 17, a tuned amplifier 18, a digital gain control 19, a diode demodulator 20, a smoothing filter 21, an analog-to-digital convertor (ADC) 22, and a computing element 23, in that order. Sections 17 to 21 are based on standard operational amplifiers, using circuits well-known to those versed in the art. Many alternative circuit arrangements can be used to perform both the general and specific functions. Computing element 23 is a conventional microprocessor with a control program stored in a read only memory (ROM), such as an electronically programmable read only memory (EPROM). As illustrated here, the ADC 22 is actually a part of computing element 23, but an external ADC would be satisfactory. Similarly, computing element 23 could be a complete computer system, as generally indicated in FIG. 1. The ADC provides the means for the stored program to monitor the incoming optical pulses.

The general operation of the analog sections 17 to 21 is described as follows. Arriving infrared pulses are converted to voltage pulses 24 by photodetector 25 and transimpedance amplifier 17 and then fed to tuned amplifier 18. Resistor 26 in series with the photodetector 25 serves as a drain for low frequency photocurrents caused by ambient light. In the tuned amplifier 18, tuning is provided by the inductor-capacitor feedback combination to provide a center frequency of about 30 kHz and full bandwidth of about 600 Hz. Thus, only signals modulated at a frequency close to 30 kHz are amplified and extraneous signals are rejected. The output of section 18, in response to the input pulses 24, is a modulated burst 27 having zero average voltage. The signals are further amplified in section 19 with an amplification factor determined by the setting of electronic switches 29. The amplified pulses are rectified in section 20 to produce base band pulses 30. These are filtered in section 21, producing smoothed pulses 31, which are input to ADC 22.

The pulses are measured by computing element 23, using repetitive ADC samples of the signal voltage. These samples are repeated at a steady rate sufficient to follow the pulse waveforms. A pulse is considered valid if it remains above a small threshold value for a number of samples corresponding to the known pulse width, and then falls below threshold. After the leading edge is found, a fixed number of sample voltages are summed to produce an average pulse height. An equal number of samples are taken and subtracted during the inter-pulse period to remove any background signal caused by rectified noise and/or amplifier offset. Successive pulses are similarly detected, each considered valid if it begins and ends at the expected times. If more than three pulses are found, the extra pulses are interpreted as a code and their amplitudes ignored. The entire pulse sequence is rejected as invalid if an unexpected transition occurs.

After each pulse sequence, the computing element 23 adjusts the gain of section 19, by closing one or more of the switches 29 in the feedback path, in accordance with the maximum amplitude of the first three pulses. The object is to obtain maximum dynamic range from the ADC 22, which can be achieved if the largest pulse amplitude is just below the full-scale range of the ADC. Such adjustment is essential because the optical signals decrease with the square of the distance from the receiver. In the absence of signals, the computing element 23 increases the gain in steps, by opening the switches 29 in section 19, until either a signal is found or maximum gain is achieved.

It is possible to calculate a cursor position from the measured pulses, such that the cursor would be positioned at the point on the screen at which the device is aimed. This is not actually desirable, as precise cursor placement requires very fine motor control if the distance to the screen is greater than a few feet. A preferred method is to translate a fixed range of rotational angles into full screen motions of the cursor, independent of distance. The cursor itself will provide visual feedback, and one can rely on human eye-hand coordination to make a final adjustment. The method is described below.

The rotation direction is calculated for the measured signals according to the following slightly idealized model. The emission from an IRLED decreases with angle and distance according to approximate formula:

$$S = \left(\frac{K}{R^2}\right)\left(1 - \left(\frac{A}{Ac}\right)^2\right) \text{watts/cm}^2, \tag{1}$$

where, Ac represents cutoff angle, beyond which the radiation is negligible. Consider first, two identical IRLEDs offset left and right by angle Ao. If the pair are then rotated in their own plane, the signals will vary as $$S_r = \left(\frac{K}{R^2}\right)\left(1 - \left(\frac{(A-Ao)}{Ac}\right)^2\right), \text{ and} \quad (2a)$$

$$S_l = \left(\frac{K}{R^2}\right)\left(1 - \left(\frac{(A+Ao)}{Ac}\right)^2\right). \quad (2b)$$

A useful measure of the left-right rotational angle Ax is $$Ax = \frac{S_l - S_r}{S_l + S_r}, \text{ and} \quad (3a)$$

Figure 5:
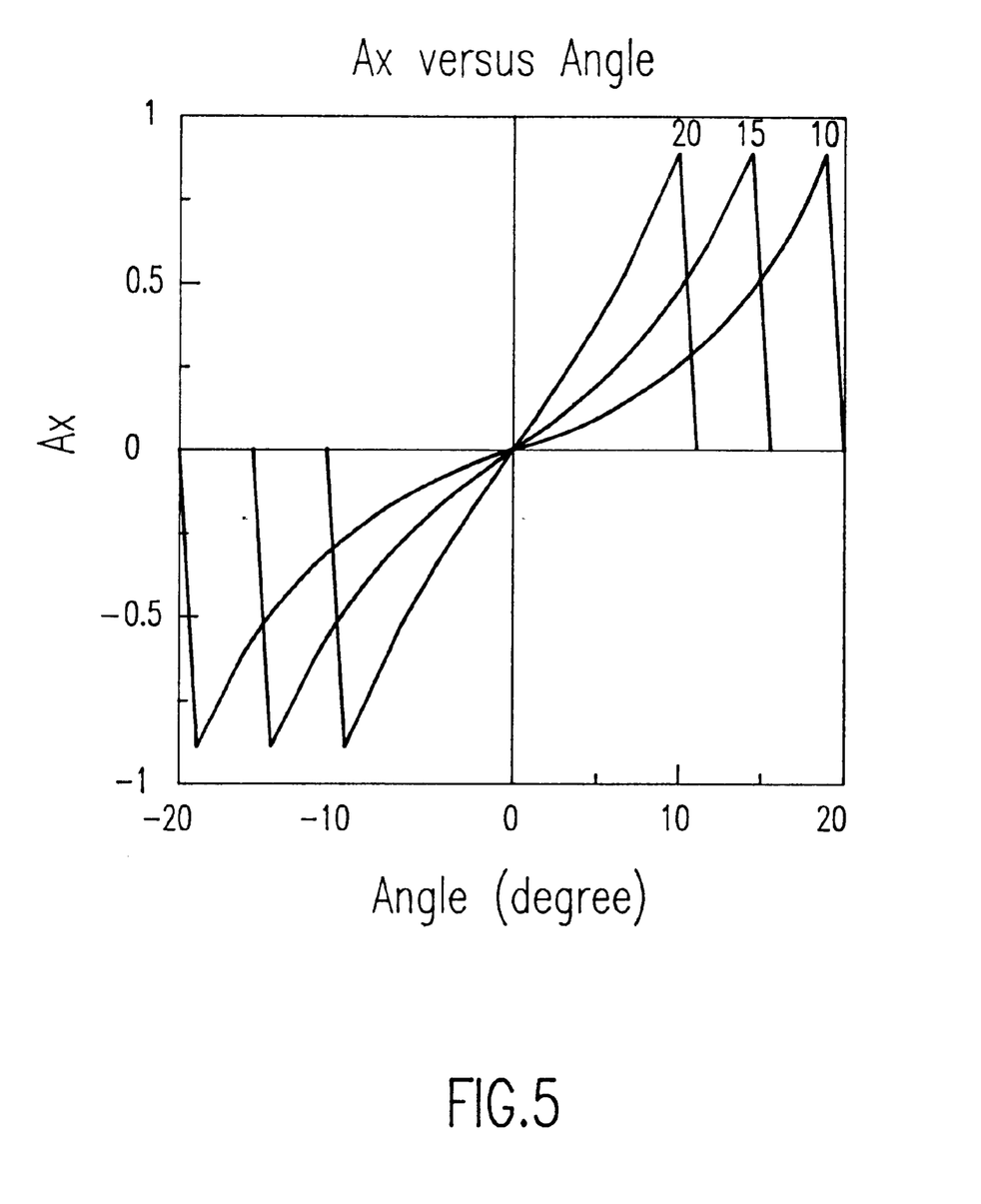
FIG. 5 is a graph of the transfer function showing the dependence of the rotation angle Ax on cutoff angle.

This measure is independent of the distance, as desired, as well as the actual power output of the IRLEDs. The dependence of Ax on angle is shown in $$Ax = \frac{\left(\frac{(A+Ao)}{Ac}\right)^2 - \left(\frac{(A-Ao)}{Ac}\right)^2}{\left(\frac{(A+Ao)}{Ac}\right)^2 + \left(\frac{(A-Ao)}{Ac}\right)^2}. \quad (3b)$$

FIG. 5 for a cutoff angle of 30°, for several values of the offset angle Ao. For this example, an offset angle of about 20° produces a smooth variation of cursor position with angle over a comfortable range of rotation angles.

The vertical position is obtained from the third IRLED, which may have a vertical offset angle equal to Ao. Denoting the vertical signal by Sv, the vertical rotation angle Ay is calculated as $$Ay = Sy(Sy + 0.5(Sl+Sr)). \quad (3c)$$

The cursor coordinates Xc and Yc are proportional to Ax and Ay, respectively.

Because of the visual feedback provided by the cursor, normal hand-eye coordination can provide excellent selection accuracy with minimal training. However, it is necessary to filter out the effect of hand tremor to avoid visible cursor jitter, while still allowing rapid cursor movements. These two goals are in conflict and cannot be realized with a conventional linear filter. A linear filter has an inherent delay between input and output, and this delay increases as the degree of filtering is increased. Instead, a nonlinear filter is required in which the degrees of filtering is decreased as the cursor velocity increases. The principle is that jitter will be less noticeable when the cursor is in rapid motion than when it is nearly stationary. If this type of filtering is done improperly, it can produce an annoying or even unstable feedback situation.

King et al., supra, recommended switching between two digital (software) filters having different filter constants, the switch occurring at a particular cursor velocity. Although this may have been suitable for a head-mounted device, it was found to be inadequate for a hand-held device, causing a jerky cursor movement. An improved filter was developed using continuously varying filter constants. In addition, a special algorithm is applied to undo the sudden jump in cursor position caused by "hand-twitch" when the button is pressed.

The filter operates on unfiltered cursor coordinates (Xc, Yc) which are obtained every Ts seconds, where Ts is the data sampling time. Filtered coordinates Xf and Yf are obtained by applying a recursive low-pass filter described by the following equations:

$$Xf(t) = Xf(t-Ts) + \frac{(Xc(t) - Xf(t-Ts))}{Nx} \quad (4a)$$

$$Yf(t) = Yf(t-Ts) + \frac{(Yc(t) - Yf(t-Ts))}{Ny} \quad (4b)$$

In a conventional recursive filter, Nx and Ny would be a constant and equal to a single constant N. Such a filter would have a fixed cutoff frequency Fc and a lag time T given by:

$$Fc = \frac{1}{(2\pi NTs)}, \text{ where } \tau = NTs \quad (5)$$

The degree of filtering increases in proportion of N. If N is made large enough to eliminate visible cursor jitter caused by hand tremors, then the cursor lag time will be excessive. Instead, the value of N is made to decrease smoothly with increasing cursor velocity (Vx, Vy). The velocity is estimated as:

$$Vx(t) = (Xc(t) - Xf(t-Ts)) \quad (6a)$$

A smooth and well-behaved function for Nx is as follows:

$$Vy(t) = (Yc(t) - Yf(t-Ts)) \quad (6b)$$

$$Nx = \frac{(A+Vx)}{(B+Vx)}, \quad (7)$$

It is evident that Nx→1 for large Vx while $$Nx \to \frac{A}{B}$$

for small Vx. The equations for Ny are identical. Substituting for the case where Nx→1, we find that Xf(t)=Xc(t) for large Vx. Thus, at high velocity, the cursor will simply follow the pointing device coordinates without filtering. During such rapid motion, jitter caused by hand tremors is not noticeable. At low velocity, the delay time and cutoff frequency become:

$$To = \left(\frac{A}{B}\right)Ts \quad (8)$$

$$Fc = \frac{1}{2\pi To} = \frac{B}{A(2\pi)Ts} \quad (9)$$

The values of A and B are adjusted empirically to obtain a good "feel", using the above relationship as a guide.

Figure 6A:
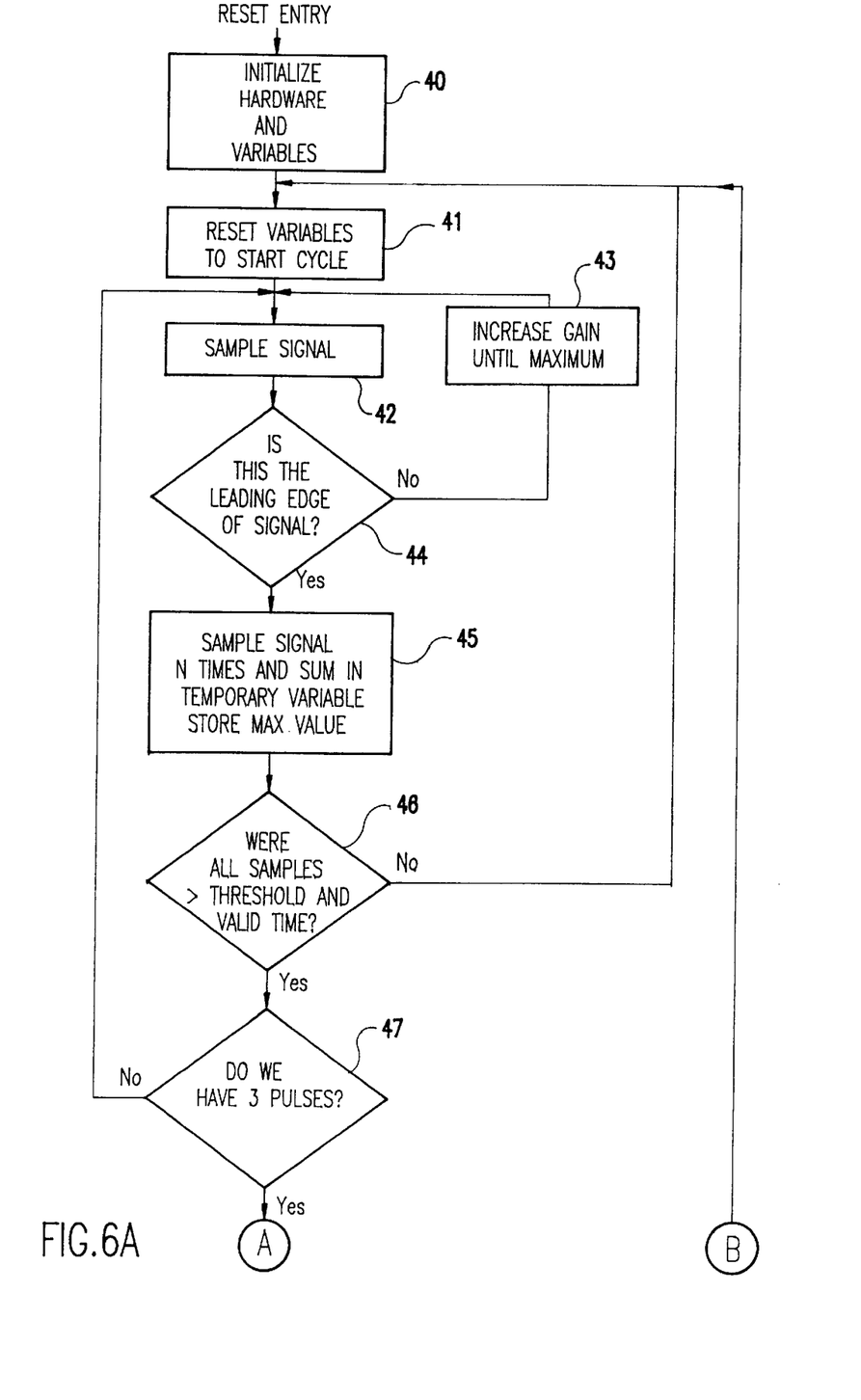
FIGS. 6A and 6B, taken together, are a flow diagram of the logic of the control program implemented by the microcontroller in the receiver shown in FIG. 4.
Figure 6B:
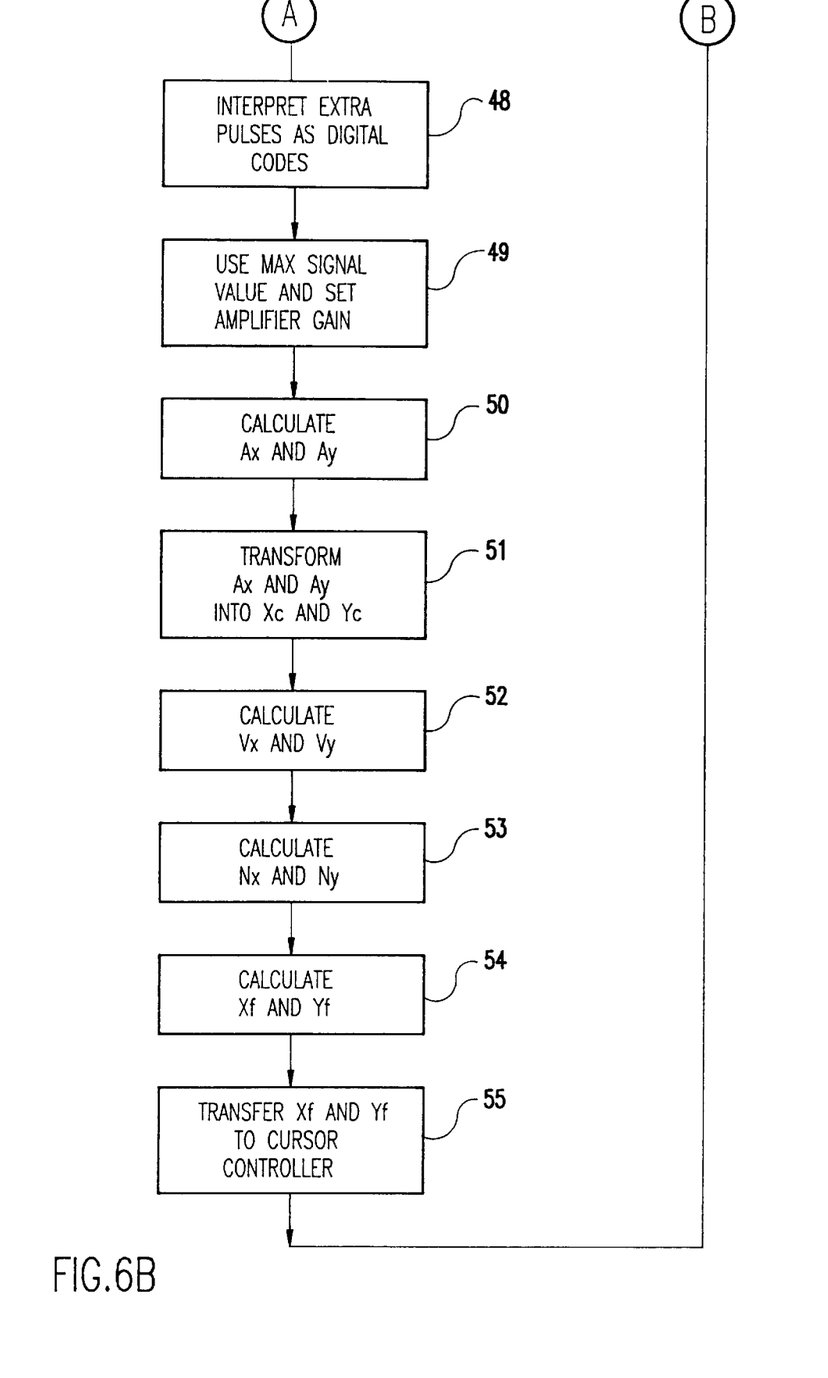

The logic of the control program of computing element 23 is further shown in the flow chart shown in FIGS. 6A and 6B. First, in FIG. 6A, hardware and variables are initialized in function block 40. Variables are reset in function block 41 to start a new cycle. A sample signal is then received in function block 42. In decision block 43, a determination is made as to whether the leading edge of the signal is being received. If not, the gain is increased by opening switches 29 in function block 44, and the process again samples the signal in function block 42. When a leading edge is detected, the signal is sampled N times in function block 45 and summed in temporary variable store maximum value.

A test is next made in decision block 46 to determine if all the samples are greater than a threshold and a valid time for a pulse. If not, the process loops back to function block 41 to reset variables and start a new cycle; otherwise, a valid pulse has been received. A test is then made in decision block 47 to determine if three pulses have been received, one from each of the IRLEDs of the hand held transmitter. If not, the process loops back to function block 42 to sample the signal in order to detect the next pulse.

When three pulses have been received, the process goes to function block 48 in FIG. 6B which interprets extra pulses as digital codes. In function block 49, the maximum signal value received is used to set the amplifier gain in section 19. Now the process of calculating the pointing location begins. In function block 50, Ax and Ay are first calculated. The calculated values of Ax and Ay are then transformed into Xc and Yc in function block 51. Vx and Vy are calculated in function block 52, as $$Vx = Xc - Xf \tag{10a}$$

$$Vy = Yc - Yf \tag{10b}$$

Nx and Ny are calculated in function block 53, as $$Nx = \frac{(A + Vx)}{(B + Vx)} \tag{11a}$$

$$Ny = \frac{(A + Vy)}{(B + Vy)} \tag{11b}$$

Xf and Yf are calculated in function block 54, as $$Xf = Xf + \frac{(Xc - Xf)}{Nx} \tag{12a}$$

$$Yf = Yf + \frac{(Yc - Yf)}{Ny} \tag{12b}$$

The new values of Xf and Yf are fed back to function block 52 to continue the calculation of Vx and Vy. At the same time, the calculated values of Xf and Yf are transferred to the cursor controller in function block 55 to move the cursor on the display. This process continues until the pointing position comes to rest, at which time the process loops back to function block 41 in FIG. 6A to await new pointing cursor signals.

A problem common to "point and shoot" devices is that the act of pressing the trigger or button spoils the aim. For some people, anticipatory and largely involuntary tremors may exaggerate the effect. A solution to this problem is based on the idea that the cursor position will have stabilized a short time prior to the button press. Using a circular buffer stack in computer memory in function block 55, a short list of prior cursor positions is maintained. After each button press, an algorithm is applied to the list to locate this stable point. The preferred embodiment of this invention makes use of this technique.

Several variations of this invention can be created. Thus, while the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A hand-held pointing device for remotely controlling a cursor on a display device comprising:
    at least three infrared light emitting diodes (IRLEDs), each of said IRLEDs aimed off a main or pointing axis of the device in different directions;
    at least one activating device on said hand-held pointing device; and
    a circuit connected to each of said IRLEDs for sequentially pulsing said IRLEDs with pulse trains so as to cause the IRLEDs to individually and sequentially emit modulated infrared light signals to position said cursor.

2. The hand-held pointing device of claim 1 wherein said activating device transmits a control signal to cause an action to occur.

3. The hand-held pointing device recited in claim 2 further comprising a plurality of activating devices and wherein said circuit is additionally responsive to said plurality of activating devices to generate additional control signals.

4. The hand-held pointing device recited in claim 1 wherein said circuit is responsive to said activating device to transmit a control code before said IRLEDs are sequentially pulsed, said control code indicating that position pulses are to follow.

5. The hand-held pointing device recited in claim 1 further comprising an optical diffusing filter positioned to pass infrared light signals emitted from said IRLEDs to improve linearity.

6. The hand-held pointing device recited in claim 1 wherein said circuit includes programmable means for storing calibration information for said plurality of IRLEDs, said circuit controlling an amplitude of pulse trains to individual IRLEDs according to the stored calibration data so as to cause said IRLEDs to emit approximately equal amplitude infrared light signals.

7. A hand-held pointing device for remotely controlling a cursor on a display device as recited in claim 1 wherein a signal from each of said IRLEDs is identified by a position of said signal in a sequence of signals from said IRLEDs.

8. A hand-held pointing device for remotely controlling a cursor on a display device as recited in claim 1 wherein an actual orientation of said hand-held pointing device is directly related to a position of said cursor.

9. A remote pointing system for controlling a cursor location on a display device comprising:
    a hand-held pointing device for remotely controlling the cursor on the display device, said pointing device comprising:
        at least three infrared light emitting diodes (IRLEDs), each of said IRLEDs aimed off a main or pointing axis of the device in different directions; and
        a circuit connected to each of said IRLEDs responsive to a user input for sequentially pulsing said IRLEDs with pulse trains so as to cause the IRLEDs to individually and sequentially emit modulated infrared light signals;
    a receiver and controller located proximate to said display device, said receiver and controller comprising:
        an infrared detector and amplifier tuned to a predetermined pulse frequency;
        a demodulator to convert received signals to analog base-band pulses;
        an analog-to-digital convertor to digitize the analog base-band pulses; and
        a digital processor to process the digitized analog base-band pulses as data representing a point of aim on the display device by the hand-held pointing device, said digital processor determining the position of a cursor on the display device.

10. The remote pointing system recited in claim 9 wherein said digital processor is programmed to calculate cursor position (Xc, Yc) as a function of rotation angles (Ax, Ay).

11. The remote pointing system recited in claim 9 wherein the hand-held pointing device further comprises one or more activating devices and wherein said circuit is additionally responsive to said one or more activating devices to generate control codes, said circuit pulsing all or some of said IRLEDs with pulse trains in accordance with said control codes subsequent to first sequentially pulsing said IRLEDs with pulse trains.

12. The remote pointing system recited in claim 11 wherein the activating devices of said hand-held pointing device comprise one or more pushbutton switches.

13. The remote pointing system recited in claim 9 wherein said circuit of the hand-held pointing device includes programmable means for storing calibration information for said plurality of IRLEDs, said circuit controlling the pulse widths of said pulse trains to individual IRLEDs according to the stored calibration data so as to cause said IRLEDs to emit approximately equal power infrared light signals.

14. A remote pointing system for controlling a cursor location on a display device as recited in claim 9 wherein a signal from each of said IRLEDs is identified by a position of said signal in a sequence of signals from said IRLEDs.

15. A remote pointing system for controlling a cursor location on a display device as recited in claim 9 wherein an actual orientation of said hand-held pointing device is directly related to a position of said cursor.

16. A remote pointing system for controlling a cursor location on a display device comprising:
   a hand-held pointing device for remotely controlling the cursor on the display device, said pointing device comprsing:
      at least three infrared light emitting diodes (IRLEDs), each of said IRLEDs aimed off a main or pointing axis of the device in different directions; and
      a circuit connected to each of said IRLEDs responsive to a user input for sequentially pulsing said IRLEDs with pulse trains so as to cause the IRLEDs to individually and sequentially emit modulated infrared light signals;
   a receiver and controller located proximate to said display device, said receiver and controller comprising;
      an infrared detector and amplifier tuned to a predetermined pulse frequency;
      a demodulator to convert received signals to analog base-band pulses;
      an analog-to-digital convertor to digitize the analog base-band pulses;
      a digital processor to process the digitized analog base-band pulses as data representing a point of aim on the display device by the hand-held pointing device, said digital processor determining the position of a cursor on the display device,
      said digital processor is programmed to calculate cursor position (Xc, Yc) as a function of rotation angles (Ax, AY) and to calculate cursor velocity (Vx(t), Vy(t)) as:

$$Vx(t)=(Xc(t)-Xf(t-Ts)), \text{ and}$$

$$VY(t)=(Yc(t)-Yf(t-Ts)),$$

where Xc(t) and Yc(t) are respectively cursor X and Y coordinates as a function of time, Xf and Yf are filtered X and Y coordinates, and Ts is a sampling time.

17. The remote pointing system recited in claim 16 wherein said digital processor is programmed to apply a digital filter to cursor position data, said digital filter having a degree of filtering which decreases smoothly with cursor velocity.

18. The remote pointing system recited in claim 17 wherein said digital filter calculates X and Y filtered coordinates as:

$$Xf(t) = Xf(t-Ts) + \frac{(Xc(t) - Xf(t-Ts))}{Nx}, \text{ and}$$

$$Yf(t) = Yf(t-Ts) + \frac{(Yc(t) - Yf(t-Ts))}{Ny},$$

where Nx and Ny are calculated as:

$$Nx = \frac{(A + Vx)}{(B + Vx)},$$

where for $$Nx \to \frac{A}{B},$$

Vx<<B, and for Nx→1, Vx>>A, and $$Ny = \frac{(A + Vy)}{(B + Vy)},$$

where for $$Ny \to \frac{A}{B},$$

Vy<<B, and for Ny→1, Vy>>A.

* * * * *